United States Patent [19]

Stearns

[11] 4,232,908
[45] Nov. 11, 1980

[54] COMBINATION PUSH-PULL VALVE ASSEMBLY

[75] Inventor: George W. Stearns, Florissant, Mo.

[73] Assignee: Wagner Electric Corporation, St. Louis, Mo.

[21] Appl. No.: 875,807

[22] Filed: Feb. 7, 1978

[51] Int. Cl.³ .................................................. B60T 13/00
[52] U.S. Cl. ........................................ 303/9; 303/13; 303/71
[58] Field of Search ................. 303/2, 6 R, 6 A, 6 M, 303/7, 8, 9, 13, 29, 63, 64, 68, 70, 71

[56] References Cited

U.S. PATENT DOCUMENTS

| | | | |
|---|---|---|---|
| 3,166,358 | 1/1965 | Valentine | 303/71 X |
| 3,519,312 | 7/1970 | Cruse | 303/13 |
| 3,690,733 | 9/1972 | Gachot | 303/7 |
| 3,747,992 | 7/1973 | Schnipke | 303/7 X |
| 3,953,079 | 4/1976 | Sebo et al. | 303/7 |
| 4,076,325 | 2/1978 | Bray | 303/7 |
| 4,088,374 | 5/1978 | Gute | 303/9 |
| 4,121,873 | 10/1978 | Durling | 303/7 |

Primary Examiner—Douglas C. Butler
Attorney, Agent, or Firm—Eyre, Mann, Lucas & Just

[57] ABSTRACT

A two knob control for tractor and trailer parking brakes providing single knob application of both tractor and trailer parking brakes. It also provides for maintaining the tractor parking brakes in the applied condition while charging the trailer brake air system and for applying the trailer brakes independently of the tractor brakes. Automatic application of trailer parking brakes is provided upon trailer breakaway or a significant reduction in tractor reservoir air pressure.

28 Claims, 5 Drawing Figures

COMBINATION PUSH-PULL VALVE ASSEMBLY

BACKGROUND OF THE INVENTION

The present invention relates to tractor trailer parking brake control.

The application and release of tractor and trailer parking brakes has normally been accomplished using separate manual controls which apply air pressure to or vent air from the lines controlling the respective parking brake systems. The line controlling the trailer system normally controls an intermediate tractor protection valve. The tractor protection valve cuts off the lines to the trailer in case of trailer breakaway to prevent catastrophic loss of air pressure from the tractor.

A total of three parking brake control valves has been required in order to give individual control of tractor and trailer parking brakes as well as single knob application of both tractor and trailer parking brakes. Individual control has been desired in order to retain the tractor parking brakes set while charging the trailer brake system and for setting the trailer parking brakes without setting the tractor brakes. Such an arrangement unfortunately may allow a dangerous condition to occur by permitting the tractor parking brake to be applied without simultaneously applying the trailer parking brakes. If such an application of tractor parking brakes alone should occur during motion of the vehicle, dangerous jackknifing of the trailer may result.

DETAILED DESCRIPTION OF THE PREFERRED EMBODIMENT

Figure 1:
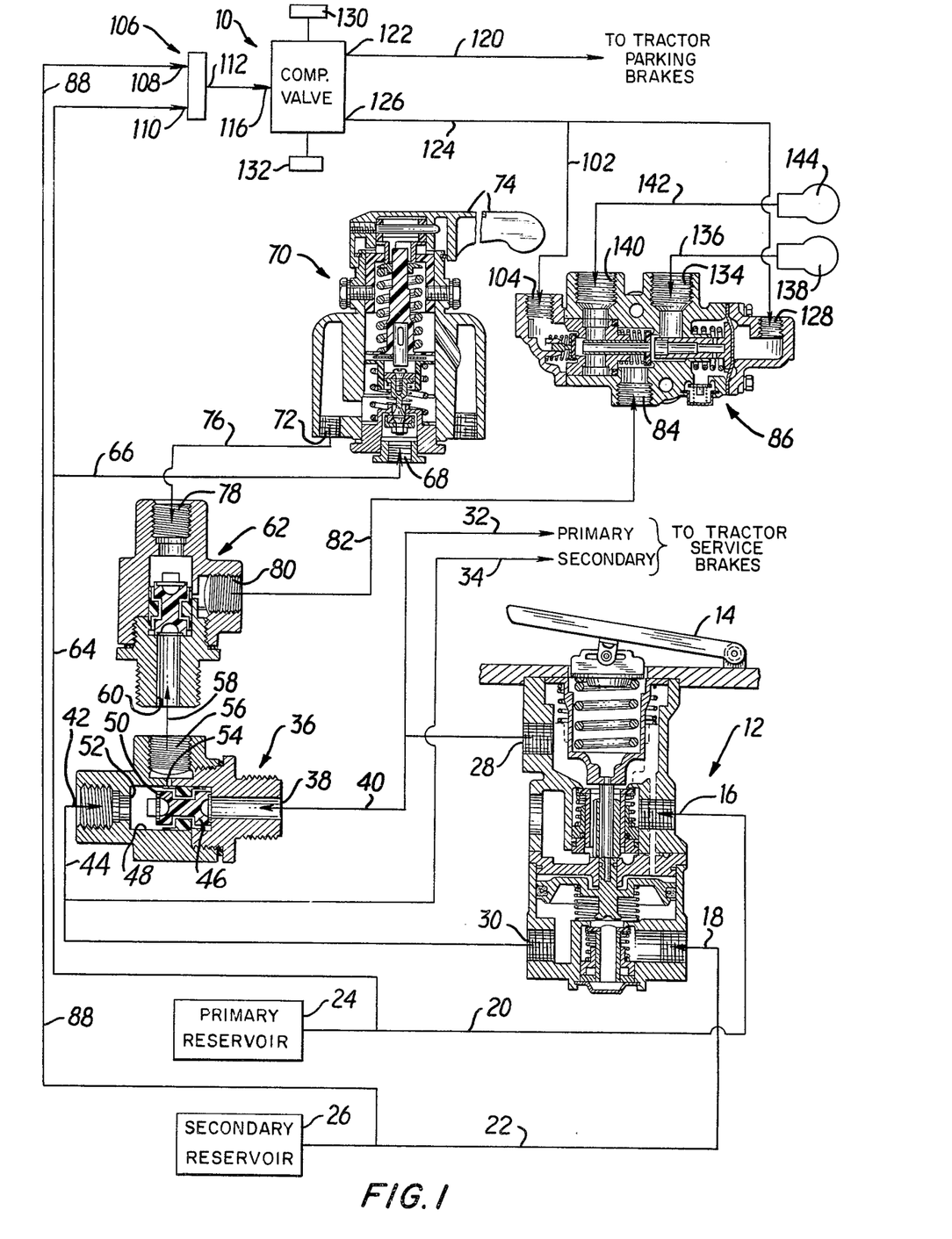
FIG. 1 shows a schematic diagram of the system including the present invention.

Referring now to FIG. 1, there is shown an air brake control system including a tractor and trailer parking brake combination control valve 10. The combination control valve 10 permits one knob control of both tractor and trailer parking brakes functions as will be described.

An application valve 12 of a type well-known in the art which may be conveniently operated by a treadle 14 receives air pressure at primary and secondary inlet ports 16 and 18 via conduits 20 and 22 from primary and secondary reservoirs 24 and 26, all respectively.

The application valve 12 is of a type well-known in the art which normally provides outlet pressures at its outlet ports 28 and 30 substantially equal and in proportion to the magnitude of the depression of the treadle 14. In case of failure of pressure in either the primary or secondary reservoir 24 or 26, the application valve is capable of continuing to perform part of its function by providing service brake pressure in its output conduit associated with the unfailed reservoir. Primary and secondary service brake pressures are connected by way of conduits 32 and 34 respectively to the tractor service brakes, not shown.

Two way check valve 36 receives primary service brake pressure at its inlet 38 by way of branch conduit 40 which is connected from conduit 32. Inlet 42 receives secondary service brake pressure via branch conduit 44 which is connected from conduit 34.

A valve shuttle 46 within valve passage 48 is free to be displaced from one end of the valve passage 48 to the other. The valve shuttle 46 has resilient sealing material 50 at its two ends which are disposed to sealably contact valve shoulders 52 at the ends of the valve passage 48. When higher air pressure exists at inlet 38 or 42, the valve shuttle 46 is displaced in the direction to contact and seal off the valve shoulder 52 leading from the inlet which has the lower pressure. An outlet channel 54 connects air pressure from the unsealed inlet 38 or 42 to an outlet 56. The outlet 56 thus contains an air pressure equal to the higher of the air pressures provided at the primary and secondary outlet ports 28, 30 of the application valve 12.

A conduit 58 is connected between the outlet 56 of two-way check valve 36 to the inlet 60 of two-way check valve 62.

Primary conduit 64, connected from conduit 20, is connected by branch conduit 66 to the pressure inlet 68 of hand controller 70. Hand controller 70 meters a controlled amount of air pressure to its outlet 72 in proportion to the amount of rotation of its control handle 74.

The air pressure in outlet 72 is connected through conduit 76 to inlet 78 of two-way check valve 62. The outlet 80 of two-way check valve 62 is connected by way of conduit 82 to a tractor service brake inlet 84 of tractor protection valve 86.

It will be clear to one skilled in the art that the connection of two-way check valves 36 and 62 selects the highest of the two pressures from application valve 12 or the pressure from hand controller 70 for connection to the tractor service brake inlet 84 of the tractor protection valve 86.

The primary conduit 64 and secondary conduit 88 are connected to inlets 108 and 110 of two-way check valve 106. The outlet 112 of two-way check valve 106 is connected by conduit 114 to the inlet 116 of combination valve 10. Due to the connection of two-way check valve 106 to the primary and secondary reservoirs 24, 26, it would be clear to one skilled in the art that the air pressure delivered to the combination valve inlet 116 is equal to the higher of the pressures in the two reservoirs. Tractor parking brake control line 120 is connected from outlet 122 to the tractor parking brakes, not shown. A trailer parking brake control line 124 is connected from outlet 126 of the combination valve 10 to a control inlet 128 and, via branch passage 102 to tractor emergency port 104 of tractor protection valve 86. Two-way check valve 106 may be separate from the combination valve 10 or alternatively the two items may be integrally formed in a single unit.

A combination manual parking brake control 130 in the combination valve 10 controls the application and exhaustion of air pressure to tractor parking brake control line 120 and the exhaustion of air pressure from the trailer parking brake control line 124 to thereby simultaneously control the application of tractor and trailer parking brakes.

A trailer manual parking brake control 132 is provided in combination valve 10 to control the application and exhaustion of air pressure to trailer parking brake control line 124 under certain conditions which will be described.

A trailer service outlet 134 feeds a trailer service conduit 136 preferably at least partially flexible pressure conduit such as rubber hose. The trailer service conduit is connected to a suitable connector such as a glad hand connector 138. A mating glad hand connector on the trailer, not shown, feeds service brake pressure to the trailer. A trailer emergency outlet 140 feeds a trailer emergency conduit 142 preferably of flexible material such as rubber hose, which is connected to glad hand connector 144. Glad hand connector 144 is normally connected to a mating connector and conduit in the trailer, not shown, to feed the trailer air reservoir system and control the trailer emergency braking system.

The tractor protection valve 86 is of a type well-known in the art and its operation will not be described in detail. For present purposes, it is sufficient to state that the presence of relatively low air pressure, for example, 20 to 35 psi, in control inlet 128 is operative to provide open pressure communication between tractor service brake inlet 84 and trailer service outlet 134 as well as providing open pressure communication between tractor emergency inlet 104 and trailer emergency outlet 140. In the event of brake system failure in the tractor, in the trailer, or of trailer breakaway, the combination valve 10 will cause the tractor protection valve to operate to seal the tractor emergency inlet 104 and the tractor service inlet 84 before a dangerous amount of pressure is allowed to escape through the trailer service and emergency conduits 136, 142.

In normal operation, when the pressure at control inlet 128 is vented by operation of either combination manual parking brake control 130 or trailer manual parking brake control 132 the tractor emergency inlet 104 is isolated from trailer emergency outlet 140 and tractor service inlet 84 is isolated from trailer service outlet 134. In addition, both trailer emergency and service conduits 142, 136 are vented to atmosphere thus engaging the trailer parking brakes. The three line tractor protection valve represented herein may be replaced by the simpler two line valve known to those skilled in the art. The combination valve 10 will then of itself provide the direct exhaustion of trailer emergency conduit 142.

Figure 2:
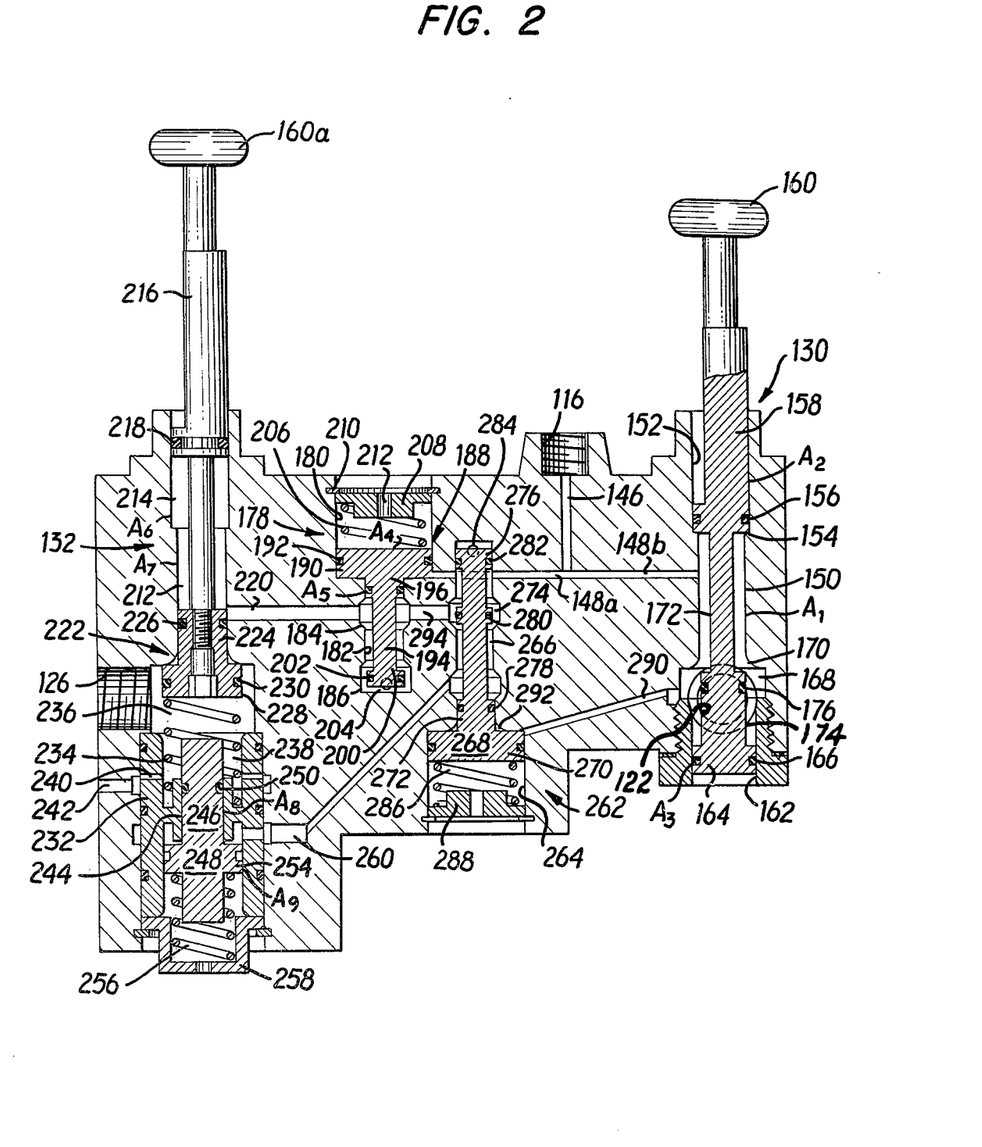
FIG. 2 shows a first embodiment of the invention in a vehicle system lacking pressurization.

Referring now to FIG. 2, a first embodiment of the combination control valve 10 is shown. In the condition illustrated, the reservoirs 24, 26, now shown in FIG. 2, are unpressurized. Consequently, the air pressure received at inlet 116 is at or near atmospheric pressure. The combination manual parking brake control 130 is shown in the depressed position to facilitate the explanation of the path of initial air flow. This control would normally be in the pulled condition when the vehicle is parked.

An inlet passage 146 is connected between the inlet 116 and a cross passage 148 having branches 148a and 148b. Branch 148b is connected to an inlet chamber 150 of combination manual parking brake control 130. The inlet chamber 150 has a cross sectional area $A_1$.

An upper chamber 152 having a cross-sectional area $A_2$ larger than $A_1$ is connected to the upper end of inlet chamber 150 by an annular shoulder 154. An annular seal 156 about a control shaft 158 makes sealing contact with the wall of upper chamber 152. A knob 160 or other manually graspable device may optionally be connected at the outer end of the control shaft 158 to enable the operator to manually push and pull the control shaft 158.

An exhaust port 162 is sealed by an exhaust valve 164 having an annular sealing ring 166 about the perimeter thereof. The exhaust valve 164 has a cross-sectional area $A_3$ which is larger than the areas $A_1$ or $A_2$.

A delivery chamber 168 is situated between the inlet chamber 150 and exhaust port 162. An outlet 122 is shown partly in dashed line at the rear of the delivery chamber 168. Outlet 122 is connected to the tractor parking brakes, not shown. A chamber 170 joins the inlet chamber 150 and the delivery chamber 168.

A rod 172 connects the control shaft 158 to the exhaust valve 164. An enlargement 174 in the lower part of the rod 172 carries an annular seal 176 concentric with the inlet chamber 150.

In the position of the combination manual parking control 130 shown in FIG. 2, air pressure connected to inlet 116 is connected through inlet passage 146, branch passage 148b, inlet chamber 150 and delivery chamber 168 to outlet 122 and thence to the tractor parking brake. Air pressure in the combination manual parking brake control 130 tends to force the control shaft 158 to remain in the illustrated position due to the fact that the air pressure acting across larger area $A_3$ develops more downward force than the air pressure acting across the smaller area $A_2$.

On the contrary, if control shaft 158 is pulled upward to the position for application of the brakes, annular seal 176 enters the inlet chamber 150, guided by the chamber 170 and seals the inlet chamber 150 from the delivery chamber 168. Consequently, air pressure is no longer delivered from inlet chamber 150 to outlet 122. In addition, the raising of exhaust valve 164 moves it out of contact with the exhaust port 162. The air pressure in the tractor parking brakes is thus enabled to exhaust from outlet 122 through the opened exhaust port 162. This applies the tractor parking brakes.

The control shaft 158 will tend to stay in the pulled position just described due to the fact that area $A_2$ is larger than area $A_1$. Consequently, the larger force of the air pressure acting across area $A_2$ as compared to area $A_1$ provides an upward component of force which maintains the control shaft 158 in the pulled position.

The following description is with reference to FIG. 2 in which the combination manual parking brake control 130 is shown in the brake release position.

An emergency valve 178 is connected to inlet passage 146 by branch 148a. The dashed lines on a portion of branch 148a indicates that the branch 148 passes behind and is not connected to the apparatus in front of it. The emergency valve 178 is situated in a larger cylindrical bore 180 connected to a smaller cylindrical bore 182 having an intermediate enlargement 184 and an end enlargement 186.

A movable valve member 188 occupies the large and smaller cylindrical bores 180, 182. A head 190 on the movable valve member 188 has an annular seal 192 about its perimeter in sealing contact with the large cylindrical bore 180. The head 190 defines an area $A_4$.

A shaft 194 connected to the head 190 has a first enlargement 196 adjacent to the head 190. A sealing ring 198 is in sealing contact between the first enlargement 196 and the smaller cylindrical bore 182 above the intermediate enlargement 184.

A second enlargement 200 on the end of the shaft 94 has an annular seal 202 about its perimeter. In the position shown, the annular seal 202 is not in contact with the smaller cylindrical bore 182 but instead is freely supported within the end enlargement 186.

A vent 204 connected to the atmosphere maintains the end enlargement 186 at atmospheric pressure and permits venting of air pressure therethrough as will be explained.

A strong spring 206 is biased between the head 190 and a spring retainer 208. The spring retainer 208 is retained in position by any convenient means such as the circlip 210 in the wall of the large cylindrical bore 180. A vent 212 through the spring retainer 208 maintains the air above the head 190 at atmospheric pressure.

As air pressure is delivered to inlet 116 and conducted by way of inlet passage 146 and branch 148a to the emergency valve 178, the air pressure is inserted between the head area $A_4$ and the area $A_5$ of the smaller cylindrical bore 182. Since the area $A_4$ is greater than the area $A_5$, the presence of air pressure in branch 148a fed between these two areas tends to urge the movable valve member 188 upward against the resisting force of the strong spring 206. The strong spring 206 exerts sufficient force to hold the emergency valve 178 in the position shown until the air pressure in branch 148a reaches a predetermined value, for example 45 to 55 psi.

The following paragraphs describe the structure of the trailer manual parking brake control 132.

An inlet chamber 212 is connected to an upper chamber 214. The upper chamber 214 has a cross-sectional area $A_6$ which is greater than the cross-sectional area $A_7$ of the inlet chamber 212.

A control shaft 216 is disposed in the upper chamber 214. A sealing ring 218, located about the perimeter of the control shaft 216 provides sealing engagement with the walls of the upper chamber 214. A passage 220 connects the intermediate enlargement 184 of the emergency valve 178 with the upper chamber 214. A valve head 222 has a smaller section 224 with an annular seal 226 on the perimeter thereof in sealing contact with inlet chamber 212.

Since the area $A_6$ is greater than the area $A_7$, any air pressure in inlet chamber 212, with the trailer manual parking brake control 132 in the pulled condition shown will result in an upward force on the control shaft 216 tending to maintain the control in the brakes-applied condition.

The valve head 222 has a larger section 228 with an annular seal 230 about its perimeter. A guide 232 is disposed below the outlet 126. A spring 234 biased between the guide 232 and the valve head 222. The spring 134 urges the valve head 222 and control shaft 216 upward into the brakes-applied position.

A delivery chamber 236 is located inside the trailer manual parking brake control 132 adjacent to the outlet 126. The guide 232 defines an upper sealable chamber 238 which is aligned with the larger section 228 of the valve head 222. An exhaust cross bore 240 in the guide 232 communicates the upper sealable chamber 238 with an exhaust port 242. When the control shaft 216 is in the position shown, the outlet 126 is placed in open communication through the delivery chamber 236 and the upper sealable chamber 238 with the exhaust port 242. Consequently, the trailer parking brake control line 124 is exhausted to atmosphere and the trailer parking brakes are applied as was previously described.

The guide 232 contains an axial bore 244. A shaft 246 of a control shuttle 248 is slidably disposed in the axial bore 244. An annular seal 250 about the perimeter of the shaft 246 sealingly engages the axial bore 244. A lower axial bore 252 in the guide 232 is sealingly engaged with a piston 254 which is connected to the shaft 246.

A spring 256 is biased between the bottom of the control shuttle 248 and a vented spring retainer 258. The spring 256 urges the control shuttle 248 upward into the position shown in FIG. 2.

A passage 290 is connected between the region 292 above the large head 270 and the delivery chamber 168 of the combination manual parking brake control 130. Thus the air pressure existing in the delivery chamber 168 is also connected to the region 292.

When air pressure begins to be delivered to inlet 116, with the controls as illustrated in FIG. 2, branch 148a remains blocked by emergency valve 178 and passage 290 is blocked by control valve 262. As the delivered air pressure reaches a low value, suitably about 10 psi, the downward force on control valve 262 due to the air pressure in region 292 is sufficient to overcome the upward force of light spring 286. The control valve 262 shuttles downward. This disengages smaller head 272 from the smaller cylindrical bore 266 and permits air pressure to flow from passage 290 to release air passage 260 and into the region above piston 254 of control shuttle 248. Smaller head 274 is moved down into sealing contact with the smaller cylindrical bore 266 and blocks off any possibility of air flow through cross passage 294.

At a predetermined pressure, suitably between 35 and 45 psi, the air pressure above piston 254 develops sufficient downward force to move control shuttle 248 downward. At this time, control shaft 216 may be pressed downward, but there is no air flow from emergency valve 178 at this pressure level to counteract the upward force of spring 234. Control shaft 216 will therefore be returned to the brakes-applied position when it is released.

At a second predetermined air pressure, the upward force on movable valve member 188 in emergency valve 178 is sufficient to move the movable valve member against the resisting force of strong spring 206. This motion disengages sealing ring 198 from smaller cylindrical bore 182 and begins communicating air pressure from branch 148a to passage 220 and thence to inlet chamber 212 of trailer manual parking brake control 132. The motion of the movable valve member 188 draws the second enlargement 200 up into sealing contact with the smaller cylindrical bore 182 and thereby seals vent 204 against the loss of air pressure to atmosphere in that direction.

Thus, air pressure is available to the delivery chamber 236 of the trailer manual parking brake control 132 when the movable valve member 188 in the emergency valve 178 is shuttled to the upward position. The upward movement of the movable valve member 188 also establishes air flow into cross passage 294. If the control shaft 158 of combination manual parking brake control 130 is in the pulled position, control valve member 268 of control valve 262 will be urged to the upward position shown by light spring 286, establishing communication between cross passage 294 and release air passage 260. The pressure causes the control shuttle 248 to be forced downward against spring 256, pulling shaft 246 out of the path of valve head 222. The control shaft 216 of trailer manual parking brake control 132 can be depressed and will remain in the depressed position to admit air from emergency valve 178 into the delivery chamber 236 and thence to the trailer system to release the trailer parking brakes. The minimum pressure admitted by emergency valve 178 into delivery chamber 236 acting on the larger section 228 of valve head 222 produces a downward force in excess of the combined upward force of return spring 234 and the pressure acting on area $A_6$. This permits the valve to remain in the depressed position to permit pressurization of the trailer system and release of the trailer parking brakes independent of the release of the tractor parking brakes.

Figure 3:
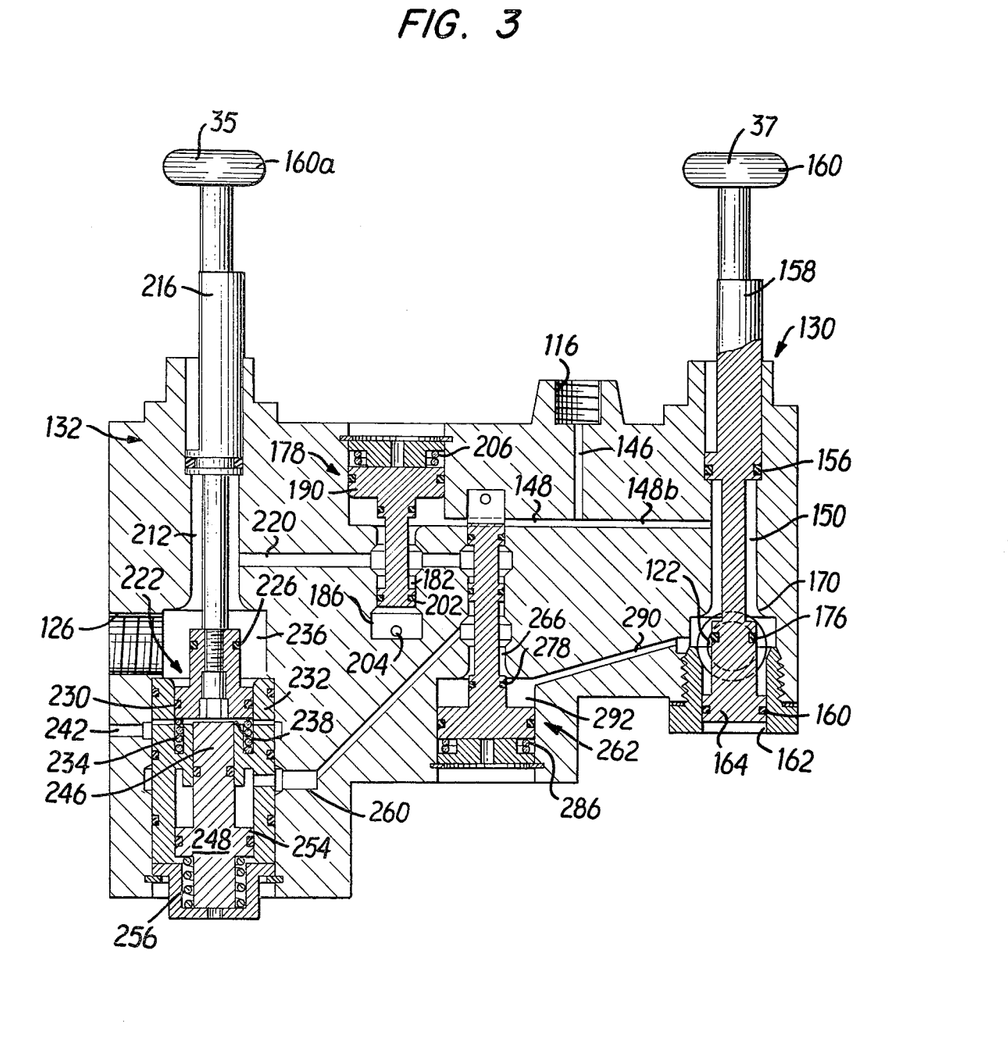
FIG. 3 shows a system in normal operation with releasing air pressure applied to both tractor and trailer brakes.

Referring now to FIG. 3, there is shown the condition of the combination valve 10 with a fully pressurized air system and with the trailer manual parking brake control 132 moved to the release position. The annular seal 226 is moved out of sealing contact with the walls of the inlet chamber 212. And the annular seal 230 is moved into sealing contact with the guide 232 and thereby seals upper sealable chamber 238 from delivery chamber 236. Consequently, the exhaust port 242 is isolated from the delivery chamber 236. Air pressure from passage 220 is connected through inlet chamber 212 and delivery chamber 236 to outlet 216 from whence it is connected via conduit 124 to the tractor protection valve 86 as was previously described.

Should the trailer become separated from the tractor while the vehicle is in motion or if the glad hand connector 144 be opened while line 142 is pressurized, the trailer manual parking brake control 132 will protect tractor reservoirs 24 and 26 from massive pressure reduction. The venting of trailer emergency conduit 142 causes a reduction in the pressure in the delivery chamber 236 due to the smaller flow area of passage 220 as compared to the air escape area of outlet 126. The upward force exerted by spring 236 now exceeds the downward force of the pressure in the delivery chamber acting on area of valve head section 228. The spring force urges valve larger section 228 from sealing contact with guide 232 opening exhaust crossbore 240 to further reduce the pressure in delivery chamber 236. Spring 234 continues to urge valve smaller section 224 into sealing contact with inlet chamber 212, thereby shutting off the flow of air into delivery chamber 236. Final closing of the valve is provided by spring 234 aided by the upward force produced by the pressure in inlet chamber 212 acting on the differential area $A_7$ minus $A_6$. The automatic closing of the control line to the tractor protection valve 86 following a sudden venting is independent of the action of emergency valve 178, control valve 262, or combination manual parking control 130, and therefore insures minimal reduction of the pressure in reservoirs 24 and 26. This same tripping action will prevent the control shaft 216 from staying in the delivery position if depressed prior to resealing the open glad hand connector.

When the air pressure at inlet 116 is significantly reduced for any reason, the pressure at all points in the valve will drop accordingly. The light spring 286 permits control valve 262 to remain in the position shown in FIG. 3 until the pressure has reached a relatively low value, for example, about 10 psi. The springs 234 and 256 will be held in the position shown within the trailer manual parking brake control 132 at the reduced pressure acting on the previously defined areas. The combination manual parking brake control 130 is biased in the brakes-released position by the reduced pressure acting on the previously defined areas within the valve. As the pressure at inlet 116 is slowly reduced, the valve components remain in the position shown in FIG. 3 until the pressure has been decreased to a low value, for example, 35 to 45 psi. At this low value, the force of strong spring 206 in emergency valve 178 exceeds the upward force of the pressure acting on area $A_4$ causing movable valve member 188 to shuttle downward into the sealed position. This moves annular seal 202 out of engagement with the smaller cylindrical bore 182 and into the end enlargement 186. This permits air pressure to flow from the inlet chamber 212 through passage 220 and smaller cylindrical bore 182 and be vented to the atmosphere through vent 204.

Venting of the inlet chamber 212 also reduced the pressure in the delivery chamber 236. At some low value of air pressure, the downward force developed due to the difference in area between larger section 228 and sealing ring 218 becomes insufficient to hold the trailer manual parking brake control in the released condition against the urging of spring 234. Consequently, the control shaft 216 is popped out, valve head 222 moves upward bringing annular seal 226 into sealing contact with inlet chamber 212 and moving annular seal 230 out of sealing contact with guide 232. The outlet 126 is vented to atmosphere through exhaust port 242 as previously described. The pressure at inlet 116 is still available to keep the tractor parking brakes released and to hold the control shuttle 246 of the trailer manual parking brake control 132 downward against the force of spring 256. The control shaft 216 may, therefore, be easily depressed in an attempt to release the trailer parking brakes, but the interruption of the air supply to the inlet chamber 212 by the closing action of emergency valve 178 prevents the delivery of air to the trailer, and control shaft 216 will return to the brakes-applied position when released. This anti-override feature prevents release of the trailer parking brakes when the tractor reservoir pressure falls to an unsafe operating level.

Starting from the brakes-released condition shown in FIG. 3, both tractor and trailer parking brakes can be applied using the single control of combination manual parking brake control 130. When control shaft 158 is pulled outward to the brakes-applied position, annular sealing ring 166 on exhaust valve 164 is moved upward out of sealing contact with exhaust port 162. At the same time annular seal 176 is moved upward into sealing contact with inlet chamber 150 guided by chamber 170. The control shaft 158 will tend to remain in the pulled position because the effective area of annular seal 156 is greater than the effective area of annular seal 176. Consequently, there is an upward net force due to the presence of air pressure in the inlet chamber 150.

Outlet 122 from the tractor parking brakes, not shown, is vented through the opened exhaust port 162. In addition, the air over control shuttle 248 is also vented through the exhaust port 162 by way of release air passage 260, smaller cylindrical bore 266, region 292 of control valve 262 and passage 290 to the delivery chamber 168. As the air pressure in the delivery chamber 168 decreases to a predetermined value and reduces the air pressure above the control shuttle 248 to a corresponding value, the control shuttle is urged upward by the spring 256 and forces the control shaft 216 of the trailer manual parking brake control 132 into the brakes-applied position. Consequently, the pulling of combination manual parking brake control 130 results in the application of both the tractor and trailer parking brakes.

Following the application of the parking brakes on the tractor and trailer by operation of the combination parking brake control 130, the control shuttle 248 in control valve 262 is returned to the upward position by light spring 286. This re-establishes communication between cross passage 294 and release air passage 260, applying pressure to piston 254 to stroke control shuttle 248, downward compressing spring 256. The trailer parking brakes can now be released by depressing control shaft 216 of trailer manual parking brake control 132. The tractor parking brakes can be released by depressing control shaft 158 of combination manual parking brake control 130. The trailer parking brakes can be subsequently applied independent of the tractor parking brakes by pulling control shaft 216 or they may be applied in conjunction with the tractor parking brakes by pulling control shaft 158. In all instances, the control shaft 216 of trailer manual parking brake control 132 will be in the pulled position when the trailer parking brakes are applied to offer a visual indicator for the driver.

Figure 4:
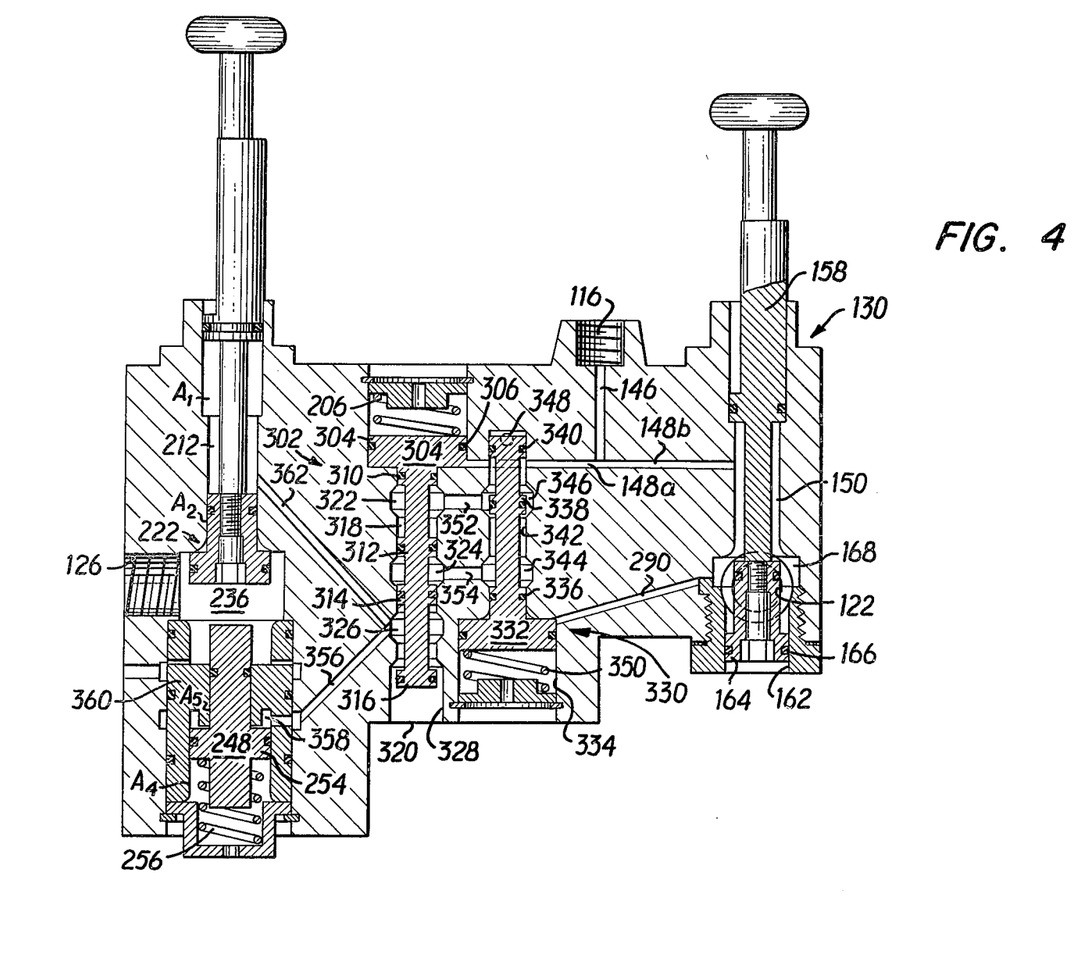
FIG. 4 shows a second embodiment of the invention unpressurized.

Referring now to FIG. 4 there is shown an embodiment of the invention having an identical combination manual parking brake control 130 as previously described but having differences elsewhere in the device. For purposes of description, FIG. 4 shows the device in an unpressurized system but with combination manual parking brake control 130 in the depressed (brakes-released) position.

Emergency valve 302 has a large head 304 having an annular seal 306 in sealing contact with large cylindrical bore 308. Four smaller heads 310, 312, 314 and 316 are spaced apart from and attached to the large head 304 in smaller cylindrical bore 318. Smaller cylindrical bore 318 is open to the atmosphere at its lower end 320 and contains four enlargements 322, 324, 326 and 328 spaced along its length in predetermined relationship to the smaller heads 310, 312, 314 and 316. A strong spring 206 urged the emergency valve 302 into the sealed position shown in which branch 148a remains sealed between large head 304 and smaller head 310.

Control valve 330 has a large head 332 slidably and sealably disposed in a large cylindrical bore 334. Three smaller heads 336, 338 and 340 are spaced apart from, and attached to, the large head 332. The smaller heads 336, 338 and 340 are disposed within a smaller cylindrical bore 342 having two enlargements 344 and 346 spaced along its length in predetermined relationship to the location of the smaller heads 336, 338 and 340. An atmospheric vent 348 in the blind end of the smaller cylindrical bore 342 prevents interference of trapped air with the motion of the control valve 330. A light spring 350 urges the control valve 330 into the position shown. A cross passage 352 is connected between enlargement 322 and enlargement 346. A cross passage 354 is connected between enlargement 324 and 344. A passage 356 is connected from the enlargement 326 to a region 358 between the piston 254 and guide 360. A passage 362 also branches from enlargement 326 and is connected to inlet chamber 212 above the valve head 222. Enlargement 326 is vented to the atmosphere in the position of the emergency valve 302 shown in FIG. 4. Consequently, there is no air pressure urging control shuttle 248 downward against the force of spring 256. Control shuttle 248, therefore, keeps the control head 222 out of sealing contact with the guide 360 and maintains the delivery chamber 236 at atmospheric pressure.

Figure 5:
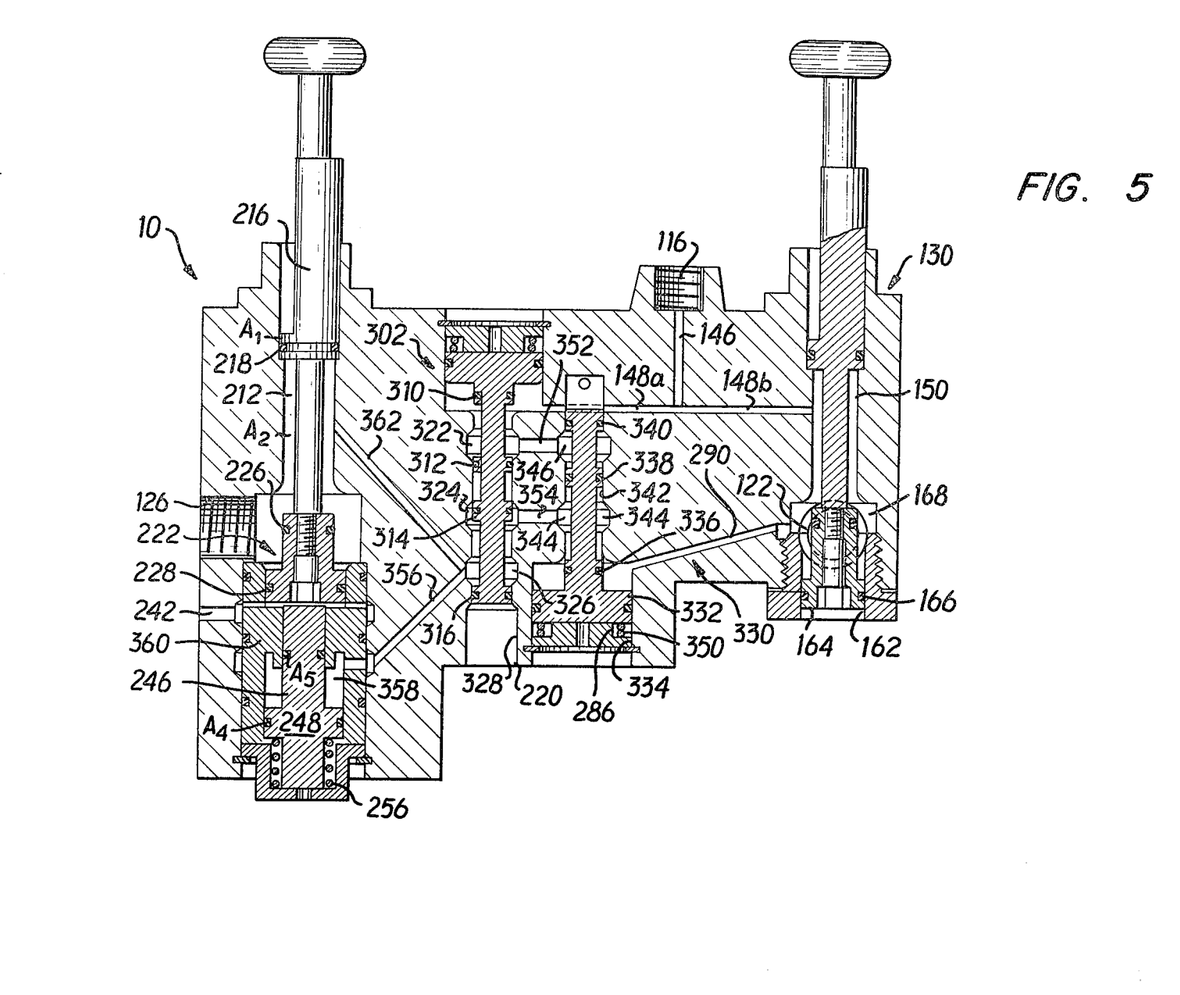
FIG. 5 shows the embodiment of FIG. 4 normally pressurized and providing releasing air pressure to both trailer and tractor brakes.

Referring now to FIG. 5, there is shown the combination valve 10 of FIG. 4 in the normal pressurized condition with both the tractor and trailer parking brakes released. Emergency valve 302 is moved upward by the air pressure from inlet 116 through inlet passage 146 and branch 148a. This raises smaller head 316 into sealing contact with smaller cylindrical bore 318 and thereby seals enlargement 328 against the discharge of air pressure from passages 356 or 362.

Control valve 330 is moved downward by the existence of pressure in passage 290 leading from the delivery chamber 168 of combination manual parking brake control 130. This motion moves smaller head 336 out of sealing contact with smaller cylindrical bore 342 and permits open communication between passage 290 and cross passage 354 by way of enlargement 344. Cross passage 354 communicates with enlargement 324 which is, in turn, in communication with enlargement 326 of the emergency valve 302. Therefore, air pressure from delivery chamber 168 is communicated through both passages 356 and 362 to region 358 below the guide 360 and to inlet chamber 212. The air pressure in region 358 retracts control shuttle 248 against the restraining force of spring 256 and thus retracts shaft 246 from interference with the valve head 222. The air pressure delivered through passage 362 provides a net downward force on the valve head 222 and shaft 216 due to the larger area of larger section 228 as compared to the area of sealing ring 218.

If the combination manual parking brake control shaft 158 is pulled, the pressure to the parking brakes and to control shuttle 248 and inlet chamber 212 is exhausted from the exhaust port 162 of combination manual parking brake control 130. The reduction of pressure above valve head 222 and in region 358 reduces the downward force resisting spring 256. Spring 256 urges the control shuttle 248 upward to unseat valve head 222 from sealing contact with guide 360, opening the exhaust and applying the trailer parking brakes. This is accomplished without the additional spring 234 in the embodiment shown in FIGS. 2 and 3. Further travel of control shuttle 248 forces annular seal 226 on valve head 222 into sealing engagement with inlet chamber 212, blocking the further flow of air into the now-vented delivery cavity.

Should a reduction in pressure in tractor reservoirs 24 and 26 occur for any reason, the emergency valve 302 will shuttle to its closed position when the pressure reaches a low value, for example 35 to 45 psi. This seals air flow from branch 148a and cross passage 354 and vents passages 356 and 362 to atmosphere, allowing spring 256 to force control shuttle 248 upward to open exhaust port 242 and apply the trailer parking brakes.

The emergency valve 302 prevents the flow of air to all portions of trailer manual parking brake control 132, thereby allowing the use of a single spring 256 to control all trailer manual parking brake control functions previously described.

It will be understood that the claims are intended to cover all changes and modifications of the preferred embodiments of the invention, herein chosen for the purpose of illustration which do not constitute departures from the spirit and scope of the invention.

What is claimed is:
1. A combination control valve comprising:
 (a) a body;
 (b) an air inlet into said body;
 (c) a first manual push-pull control valve in said body connected between said air inlet and a first outlet;
 (d) said first manual push-pull valve having first and second selectable positions;
 (e) first valve means in said first manual push-pull control valve for connecting air pressure from said air inlet to said first outlet when said first manual push-pull control valve is in its first position and for blocking the flow of air pressure from said air inlet to said first outlet when in its second position;

(f) said first valve means being further operative to vent air pressure from said first outlet when said first manual push-pull control valve is in its second position;

(g) a second manual push-pull control valve having first and second selectable positions in said body connected to a second outlet;

(h) an emergency valve connected to said air inlet;

(i) a first passage for admitting air pressure to said second manual push-pull control valve;

(j) a pressure-responsive control shuttle reciprocatably disposed in said body;

(k) a second passage for admitting air pressure to said control shuttle;

(l) resilient means for biasing said control shuttle into a first position;

(m) said control shuttle being operative when in its first position to oppose said second manual push-pull control valve from being placed in its second position;

(n) a third passage connecting air pressure from said first outlet to said control shuttle;

(o) air pressure responsive means on said control shuttle responsive to air pressure exceeding a predetermined value to displace said control shuttle to a second position wherein it does not oppose said second manual push-pull control valve being in its second position;

(p) said emergency valve being displaceable from a first position to a second position by air pressure at said air inlet exceeding a second predetermined value;

(q) means on said emergency valve for blocking at least said second passage when said emergency valve is in its first position;

(r) said second passage being connected to said first outlet; and (s) said second manual push-pull control valve having seal means for blocking said first passage and preventing the connection of air pressure to said second outlet and for venting air pressure at said second outlet when said second manual push-pull control valve is in its first position, and for providing air pressure communication between said first passage and said second outlet when said second manual push-pull control valve is in its second position.

2. In a system for controlling the brakes in a tractor and trailer vehicle, wherein an application valve is manually controllable to meter a controllable service air pressure from at least one air pressure reservoir to tractor and trailer service brake conduits, the trailer service brake conduit passing through and being controlled by a tractor protection valve, a trailer emergency conduit from said at least one air pressure reservoirs through and being controlled by said tractor protection valve, and tractor and trailer parking brake manual controls, wherein the improvement comprises:

(a) a valve assembly containing said tractor and trailer parking brake manual controls;

(b) first means in said valve assembly for applying and exhausting air pressure to and from the tractor parking brake conduit;

(c) second means in said valve assembly for applying controlling air pressure to said tractor protection valve whereby said trailer service and parking brake conduits are controlled; and (d) means in said valve assembly for permitting said second means to apply controlling air pressure only when said first means is applying air pressure in excess of a predetermined value to said tractor parking brake conduit.

3. In a tractor and trailer brake system of the type having at least one air pressure reservoir on the tractor, a tractor protection valve and parking brake control means in the tractor for controlling the application and release of tractor and trailer parking brakes, a trailer emergency conduit for applying and exhausting emergency air pressure to said trailer, the improvement comprising:

(a) first air pressure application means in said parking brake control means for controlling the applying and venting of air pressure to said tractor parking brakes;

(b) second air pressure application means in said parking brake control means for controlling the applying and venting of air pressure to said tractor protection valve;

(c) air pressure responsive means in said tractor protection valve for controlling the passage therethrough of air pressure from said second air pressure application means to said trailer emergency conduit;

(d) said air pressure responsive means being further operative to block the passage of all air pressure from said tractor to said trailer when said second air pressure application means is venting; and (e) means in said second air pressure application means for changing from applying to venting upon a substantial reduction in air pressure in said trailer emergency conduit.

4. The tractor and trailer brake system recited in claim 3 further comprising:

(a) means for connecting service air pressure from said tractor to said tractor protection valve; and (b) a trailer service brake conduit connected to said tractor protection valve.

5. The tractor and trailer brake system recited in claim 3 further comprising:

(a) manual control means on said second air pressure application means having first and second positions for manually selecting either the applying or the venting function respectively thereof; and (b) said second air pressure application means having return means for automatically urging said manual control means toward its second position and for holding it there whenever the venting function occurs whereby a visual indication of the condition of the tractor parking brakes is provided.

6. The tractor and trailer brake system recited in claim 5 further comprising:

(a) said return means comprising resilient means for urging said manual control means from its first position toward its second position;

(b) differential area means in said second air pressure application means responsive to the air pressure being connected therefrom for opposing the urging of said resilient means; and (c) said resilient means being operative to overcome said differential area means at air pressure less than a predetermined value.

7. The tractor and trailer brake system recited in claim 6 further comprising second differential area means responsive to other air pressure for urging said manual control means fully into its second position after the operation of said resilient means and for tending to hold it in said second position.

8. The tractor and trailer brake system recited in claim 3 further comprising:
   (a) first manual control means for controlling said first air pressure application means having a first position for releasing said tractor parking brakes and a second position for applying said tractor parking brakes;
   (b) second manual control means for controlling said second air pressure application means having a first position for releasing said trailer parking brakes and a second position for applying said trailer parking brakes; and
   (c) means for permitting said first manual control means to be placed in either its first or its second position regardless the existing position of said second manual control means.

9. The tractor and trailer brake system recited in claim 8 further comprising air pressure responsive control means for urging said second manual control means to its second position when said first manual control means is moved from its first position to its second position.

10. The tractor and trailer brake system recited in claim 8 further comprising means for permitting said second manual control means to be placed in either its first or its second position regardless the existing position of said first manual control means.

11. The tractor and trailer brake system recited in claim 10 further comprising air pressure responsive control means for urging said second manual control means to its second position when said first manual control means is moved from its first position to its second position.

12. The tractor and trailer brake system recited in claim 3 further comprising emergency valve means for preventing said second air pressure application means from applying when the air pressure in said at least one air pressure reservoir is below a predetermined pressure.

13. The tractor and trailer brake system recited in claim 12 further comprising means for changing said second air pressure application means from its applying to its venting function when the air pressure in said at least one air pressure reservoir drops below said predetermined pressure.

14. A combination parking brake control system comprising:
   (a) first air pressure application means for selectively applying and releasing at least one parking brake;
   (b) second air pressure application means for selectively applying and releasing at least a second parking brake;
   (c) interconnecting means for changing said second air pressure application means from releasing to applying when said first air pressure application means is changed from releasing to applying;
   (d) control valve means for permitting said second air pressure application means selectively applying and releasing said second parking brake whenever said first air application means performs its releasing function; and
   (e) said control valve means also prohibiting said second air pressure application means from performing its brake releasing function until a predetermined time after said first air pressure application means initiates its applying function.

15. The combination parking brake control system recited in claim 14 further comprising:
   (a) means in said parking brake control system for permitting changing said first air pressure application means from applying to releasing or from releasing to applying regardless of the function being performed by said second air pressure application means; and
   (b) second means in said parking brake control system for permitting changing said second air pressure application means from applying to releasing or from releasing to applying regardless of the function being performed by said first air pressure application means.

16. The combination parking brake control system recited in claim 14 further comprising air pressure responsive emergency means for changing said second air pressure application means from releasing to applying in response to a reduction in air pressure below a predetermined value.

17. The combination parking brake control recited in claim 16 further comprising said air pressure responsive emergency means being further operative to prevent changing said second air pressure application means from applying to releasing while said air pressure remains below said predetermined value.

18. A valve assembly comprising:
   (a) a body;
   (b) air pressure inlet means in said body for connecting air pressure to said body;
   (c) first air pressure application means in said body for selectively applying said air pressure to a first outlet from said body and for venting air pressure from said first outlet;
   (d) second air pressure application means in said body for selectively applying said air pressure to a second outlet from said body and for venting air pressure from said second outlet;
   (e) air pressure responsive control means in said body for halting the applying of air pressure to said second outlet when said first outlet is changed from supplying to venting and for thereupon venting said second outlet; and
   (f) emergency valve means for blocking air pressure from said second air pressure application means when the air pressure at said air pressure inlet means is below a predetermined value and for establishing open air pressure communication therebetween when the air pressure at said air pressure inlet means exceeds said predetermined value.

19. The valve assembly recited in claim 18 further comprising venting means in said emergency valve means for venting air pressure from said second air pressure application means when said emergency valve means is performing its blocking function.

20. A valve assembly comprising:
   (a) a body;
   (b) air pressure inlet means in said body for connecting air pressure to said body;
   (c) first air pressure application means in said body for selectively applying said air pressure to a first outlet from said body and for venting air pressure from said first outlet;

(d) second air pressure application means in said body for selectively applying said air pressure to a second outlet from said body and for venting air pressure from said second outlet;

(e) air pressure responsive control means in said body for halting the applying of air pressure to said second outlet when said first outlet is changed from supplying to venting and for thereupon venting said second outlet;

(f) said body having a passage for connecting air pressure at said first outlet to said air pressure responsive control means;

(g) control valve means in said passage for blocking said passage when the air pressure at said first outlet is less than a predetermined value;

(h) said air pressure responsive control means being operative for preventing the operation of said second air pressure application means at air pressure below a second predetermined value; and (i) said second predetermined value being substantially higher than said first predetermined value.

21. The valve assembly recited in claim 20 wherein said air pressure responsive control means is further operative for opposing the operation of said second air pressure application means when the air pressure at said air pressure inlet means is lower than a predetermined value.

22. The valve assembly recited in claim 20 further comprising:
(a) a second passage for connecting air pressure from said air pressure inlet to said second air pressure application means; and
(b) emergency valve means for blocking said second passage when the air pressure at said air pressure inlet is below a second predetermined value and for venting the air pressure application means when the air pressure at said air pressure inlet is below said second predetermined value.

23. The valve assembly recited in claim 22 further comprising said control valve means forming at least part of said second passage when said control valve means is performing its blocking function.

24. The valve assembly recited in claim 22 further comprising said first passage and said second passage being in open pressure communication between said air pressure responsive control means and said second air pressure application means.

25. A valve assembly comprising:
(a) a valve body;
(b) air pressure entry means for air pressure in said valve body;
(c) first air pressure application means for valving air pressure to a first outlet in a first position thereof and for exhausting air pressure from said first outlet in a second position thereof;
(d) second air pressure application means for valving air pressure to a second outlet in a first position thereof and for exhausting air pressure from said second outlet in a second position thereof;
(e) control piston means in air pressure communication with said first outlet;
(f) resilient means for biasing said control piston into a first position;
(g) means on said control piston means for opposing said second air pressure application means being placed in its first position when said control piston means is in its first position;

(h) pressure responsive means on said control piston means for moving said control piston means against said resilient means for biasing to a second position during times when air pressure exceeds a predetermined value whereby said second air pressure application means is enabled to be placed in its first position whenever said control piston means is in its second position;

(i) second pressure responsive valve means for blocking air pressure application from said air pressure entry means to said second air pressure application means at air pressure less than a second predetermined value and for connection thereof at higher air pressure; and (j) second means in said second pressure responsive valve means for venting air pressure from said second air pressure application means at air pressure less than said second predetermined value.

26. The valve assembly recited in claim 25 further comprising:
(a) pressure responsive control valve means having first and second positions;
(b) means on said pressure responsive control valve means for connecting air pressure from said air pressure entry means to said pressure responsive means on said control piston means when said pressure responsive control valve means is in its first position;
(c) second means on said pressure responsive control valve means for connecting air pressure from said first outlet to said pressure responsive means on said control piston means when said pressure responsive control valve means is in its second position;
(d) third means on said pressure responsive control valve means for moving said pressure responsive control valve means from its first to its second position upon the occurrence of air pressure in said first outlet exceeding a third predetermined value;
(e) said third predetermined value being substantially lower than said first and said second predetermined values; and
(f) said third means being further operative to hold said pressure responsive control valve means in its second position while the air pressure at said control piston means remains above said third predetermined value whereby air pressure above said third predetermined value may be exhausted from said control piston means upon a decrease in pressure at said first outlet.

27. A valve assembly comprising:
(a) a valve body;
(b) air pressure entry means for air pressure in said valve body;
(c) first air pressure application means for valving air pressure to a first outlet in a first position thereof and for exhausting air pressure from said first outlet in a second position thereof;
(d) second air pressure application means for valving air pressure to a second outlet in a first position thereof and for exhausting air pressure from said second outlet in a second position thereof;
(e) control piston means in air pressure communication with said first outlet;
(f) resilient means for biasing said control piston into a first position;
(g) means on said control piston means for opposing said second air pressure application means being placed in its first position when said control piston means is in its first position;

(h) pressure responsive means on said control piston means for moving said control piston means against said resilient means for biasing to a second position during times when air pressure exceeds a predetermined value whereby said second air pressure application means is enabled to be placed in its first position whenever said control piston means is in its second position;

(i) pressure responsive control valve means having first and second positions;

(j) means on said pressure responsive control valve means for connecting air pressure from said air pressure entry means to said pressure responsive means on said control piston means when said pressure responsive control valve means is in its first position;

(k) second means on said pressure responsive control valve means for connecting air pressure from said first outlet to said pressure responsive means on said control piston means when said pressure responsive control valve means is in its second position;

(l) third means on said pressure responsive control valve means for moving said pressure responsive control valve means from its first to its second position upon the occurrence of air pressure in said first outlet exceeding a second predetermined value;

(m) said second predetermined value being substantially lower than said first predetermined value; and (n) said third means being further operative to hold said pressure responsive control valve means in its second position while the air pressure at said control piston means remains above said second predetermined value whereby air pressure above said second predetermined value may be exhausted from said control piston means upon a decrease in pressure at said first outlet.

28. A valve assembly comprising:
(a) a valve body;
(b) air pressure entry means for air pressure in said valve body;
(c) first air pressure application means for valving air pressure to a first outlet in a first position thereof and for exhausting air pressure from said first outlet in a second position thereof;
(d) second air pressure application means for valving air pressure to a second outlet in a first position thereof and for exhausting air pressure from said second outlet in a second position thereof;
(e) said second air pressure application means comprising:
  (i) inlet chamber means for receiving said air pressure;
  (ii) delivery chamber means contiguous with said inlet chamber means;
  (iii) said delivery chamber means being in open pressure communication with said second outlet;
  (iv) an exhaust port;
  (v) a valve head having first and second seals thereon;
  (vi) said valve head being reciprocatable between first and second positions;
  (vii) said first seal being concentrically aligned with said inlet chamber;
  (viii) said first seal entering and sealing said inlet chamber from said delivery chamber when said valve head is in its first position;
  (ix) a sealable chamber between said delivery chamber and said exhaust port;
  (x) said second seal being concentrically aligned with said sealable chamber;
  (xi) said second seal being disengaged from said sealable chamber when said valve head is in its first position;
  (xii) said first seal being disengaged from said inlet chamber when said valve head is in its second position whereby open fluid communication is provided between said inlet chamber and said delivery chamber; and
  (xiii) said second seal being engaged with said sealable chamber when said valve head is in its second position whereby fluid communication between said delivery chamber and said exhaust port is blocked;
(f) control piston means in air pressure communication with said first outlet;
(g) resilient means for biasing said control piston into a first position;
(h) means on said control piston means for opposing said second air pressure application means being placed in its first position when said control piston means is in its first position;
(i) pressure responsive means on said control piston means for moving said control piston means against said resilient means for biasing to a second position during times when air pressure exceeds a predetermined value whereby said second air pressure application means is enabled to be placed in its first position whenever said control piston means is in its second position.

* * * * *